United States Patent [19]

Booth, Jr. et al.

[11] 4,367,044

[45] Jan. 4, 1983

[54] SITU RATE AND DEPTH MONITOR FOR SILICON ETCHING

[75] Inventors: Robert M. Booth, Jr., Wappingers Falls; Chester A. Wasik, Poughkeepsie, both of N.Y.

[73] Assignee: International Business Machines Corp., Armonk, N.Y.

[21] Appl. No.: 221,868

[22] Filed: Dec. 31, 1980

[51] Int. Cl.³ .................... G01B 21/08; G01B 17/02
[52] U.S. Cl. .................................. 356/357; 356/382; 156/626
[58] Field of Search ............... 356/355, 356, 357, 376, 356/378, 381, 382, 243; 204/192 E, 298; 156/626

[56] References Cited

U.S. PATENT DOCUMENTS

| | | | |
|---|---|---|---|
| 3,612,692 | 10/1971 | Kruppa | 356/357 |
| 3,645,623 | 2/1972 | Patten | 356/381 |
| 3,664,942 | 5/1972 | Havas et al. | 204/192 |
| 4,039,370 | 8/1977 | Kleinknecht | 156/626 |
| 4,147,435 | 4/1979 | Habegger | 356/357 |
| 4,260,259 | 4/1981 | Kirk | 356/357 |
| 4,293,224 | 10/1981 | Gaston et al. | 356/357 |

FOREIGN PATENT DOCUMENTS

2029017  3/1980  United Kingdom ............. 356/381

OTHER PUBLICATIONS

Groner et al., "Measurement of Deposition Rate in Matrix Spectroscopy with a Small Laser", J. Phys. E., vol. 6, No. 2, (Feb. 1972), pp. 122-123.

Logan et al., "In Situ Etch Rate Monitor/Etch End Point Detector for Opaque Materials", *IBM Technical Disclosure Bulletin,* vol. 21, No. 6, Nov. 1978, p. 2314.

*Primary Examiner*—R. A. Rosenberger
*Attorney, Agent, or Firm*—John A. Jordan

[57] ABSTRACT

An in situ thickness change monitor for determining thickness change in opaque product material, such as silicon, in chamber apparatus, such as reactive ion etching apparatus, operative to produce such thickness change. Reference material having thickness change properties, such as etch-rate, correlatable to the product material thickness change properties is deposited upon a substrate having an index of refraction such as to form a monitor exhibiting an optical discontinuity. With the monitor positioned within the chamber with the product material, light directed thereto acts to provide reflected beams producing light having an intensity variation due to interference indicative of the thickness of the reference material. Changes in the thickness of the reference material are correlated to changes in thickness of the product material.

22 Claims, 8 Drawing Figures

SITU RATE AND DEPTH MONITOR FOR SILICON ETCHING

DESCRIPTION

BACKGROUND OF THE INVENTION

1. Field of the Invention

The present invention relates to a method and apparatus for the in situ rate and depth monitoring of thin film materials undergoing small thickness changes and, more particularly, to a method and appartus for the in situ monitoring and measurement of rate and depth of change in film thickness caused by etching or deposition.

2. Description of Problem and Prior Art

Typical fabrication techniques for microelectronic devices require small and exacting changes be made in thin films of material such as thin films of silicon material. Because conventional materials, such as silicon, used for such fabrication are often generally opaque to light because of overall thickness, conventional thin film interference techniques cannot be used to monitor the required small changes in thickness which result during device fabrication from etching or deposition.

Prior art techniques, such as those employed by Habeggar et al. in U.S. Pat. No. 4,147,435 typically rely on the use of two-beam interferometry to extract the etch rate of such opaque materials. In such arrangements, a single wavefront of light is split into two beams, one of which strikes a non-etching surface which serves as a reference while the other beam strikes the surface being etched which is moving away from the reference. The change in path length causes a phase shift which produces the sinusoidal-type signal after the two beams are recombined at the photo-detector.

The difficulty with two-beam interferometry approaches is that they all suffer from inherent poor thickness resolution since, in many instances, the total etch depth (such as in etching silicon) is on the same order of mangitude as the resolution, i.e. about λ/2 since the index of refraction is 1 in the case of, for example, Habegger et al. In addition, the typical two-beam interferometry approach suffers from the fact that the hardware is difficult to align and maintain aligned. Moreover, two-beam interferometry approaches suffer from poor signal-to-noise ratios.

A further difficulty with two-beam interferometry approaches resides in the fact that these techniques use photoresist (transparent) as a mask to create a non-etching reference surface. The techniques, then, are useful only when the resist available etches slower than the material being etched by a factor of about 3 or 4, for otherwise the resulting interferometry signal is ambiguous. One solution to this latter difficulty is to use non-erodable material as a mask, such as the Al₂O₃ mask used by Logan et al as described in an article entitled "In Situ Rate Monitor/Etch End-Point Detector for Opaque Materials" in the IBM Technical Disclosure Bulletin, Vol. 21, No. 6, November 1978, p. 2314. While this latter approach remedies the erosion of the non-etching surface problem, it requires the introduction of foreign materials which may act to contaminate the product being manufactured.

SUMMARY OF THE INVENTION

It is, therefore, an object of the present invention to provide an improved in situ rate and depth monitoring method and apparatus for monitoring the etching or deposition of material as it undergoes thickness change.

It is a further object of the present invention to provide an improved rate and thickness monitoring method and apparatus for monitoring the etching of material which is opaque to light.

It is yet a further object of the present invention to provide an improved method and apparatus for rate and depth monitoring of thickness changes in film materials with high resolution and accuracy.

It is yet still a further object of the present invention to provide an in situ rate and thickness monitor and method which is simple in design and easy to install and maintain.

It is yet another object of the present invention to provide an improved in situ method and apparatus for monitoring and measuring etch or deposition rate and changes in film thickness with improved resolution and signal-to-noise ratio.

It is yet still another object of the present invention to provide an improved in situ method and apparatus for monitoring and measuring etch or deposition rate and changes in film thickness of silicon layers.

In accordance with the present invention, a monitor wafer is fabricated by depositing a relatively thick layer of reference material over a layer of material with a different refractive index, e.g. lower. The reference material is selected to have an etch or deposition rate correlatable with the work or product material to be etched or deposited upon, i.e. an etch rate that predictably varies from that of the work material. Reflective techniques are used on the monitor wafer to monitor the thickness and rate of change of the reference layer in the etching or deposition environment. This information is correlated with the known etch rate of the product material undergoing thickness change due to etch or deposition such that the depth of etch, for example, of the product material may be determined.

In a preferred embodiment, to monitor single crystalline silicon a monitor wafer is fabricated by depositing a layer of polysilicon, for example one micron thick, on a layer of silicon dioxide (e.g. approx. 500 nm) which is thermally grown on a silicon wafer. Since polysilicon and single crystal silicon etch at near the same rate, monitoring the change in polysilicon thickness can readily be correlated directly to the etch depth in the single crystalline silicon.

DETAILED DESCRIPTION OF THE PREFERRED EMBODIMENTS

Figure 1A:
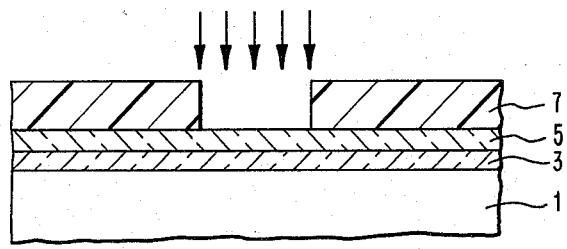
FIG. 1A shows a typical product material to be etched.

The product material shown in FIG. 1A is typically a semiconductor wafer requiring some degree of etching in the underlying silicon substrate 1 during processing in the fabrication of microelectronic devices. Typically, semiconductor substrate 1 would comprise a single crystalline material having deposited thereupon dielectric layers 3 and 5. For example, layer 3 may be a $SiO_2$ layer and layer 5 may be $Si_3N_4$ layer. Layer 7 typically may be a resist material acting as an etching mask.

Figure 1B:
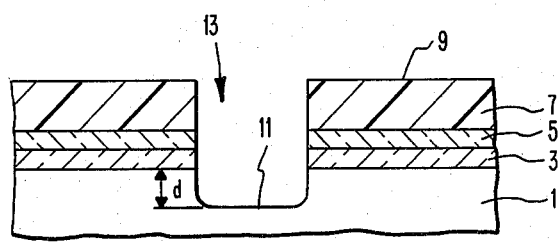
FIG. 1B shows the product material having been etched using the monitoring method and apparatus, in accordance with the present invention.

FIG. 1B shows the wafer and overlying dielectric layers etched to form a trench which may be used, for example, as a deep dielectric isolation trench or for recessed oxide isolation. Typically, etching may be achieved by reactive ion etching, although other forms of etching may as readily be employed. Since it has been found in reactive ion etching, for example, that resist material 7 will also etch to some degree while the trench is being etched, it is difficult to establish a reference by which the depth of etch in the trench may be measured. Thus, with both surface 9 of layer 7 and surface 11 in trench 13 moving, the extent of etching in trench 13 is difficult to ascertain.

In accordance with the principles of the present invention, an in situ rate and depth monitor method and arrangement is provided for monitoring and measuring the etch rate and depth of etch in etching environments, as has been described with reference to FIGS. 1A and 1B. More particularly, the in situ etch rate and etch depth monitoring arrangement of the present invention is employed particularly in those instances where no exact reference surface is obtainable, i.e. where all surfaces etch to some degree and the layer to be etched is sufficiently thick so as to be generally opaque thereby precluding the depth of etch of such layer from being determined via the reflectivity mode of monitoring. Thus, silicon layer 1 in FIG. 1B is sufficiently thick and opaque whereby the bottom surface of its substrate may not be employed as a reference surface.

It should be understood that although reference is made herein to particular material and conditions whereby the method and apparatus in accordance with the present invention may be employed, it should be understood that the present method and apparatus may be employed under any of a variety of conditions whereby precise in situ etch rate and etch depth monitoring and measuring is required. Thus, the method and apparatus of the present invention may be employed for measuring rates of change in thickness of a layer and the depth of etch in a layer in any of a variety of materials. Likewise, the method and apparatus in accordacne with the present invention may be employed not only for changes in film thickness due to etching but also may be employed for changes in thickness of film due to deposition whereby the film increases in thickness. Likewise, although reference is made to etching through reactive ion etching, other etching techniques may as readily be employed.

Figure 2A:
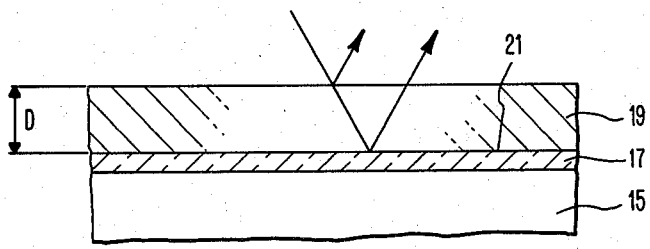
FIG. 2A shows the monitor wafer, employed in accordance with the principles of the present invention.

With reference to FIG. 2A, the monitoring wafer in accordance with the present invention is fabricated from a material having an etching rate (or deposition rate) which is known and correlatable to that of the product material being etched. In this regard, then, the monitor material etching rate, for example, must be predictable whereby its etch rate function may be correlated to the etch rate function of the product material. In the preferred embodiment, whereby silicon is being etched in the product material, a layer of polysilicon is employed as the reference material in the monitor wafer.

Thus, in FIG. 2A, the monitor wafer may comprise a silicon substrate 15 upon which a layer of silicon dioxide 17 approximately 500 nm thick is thermally grown. A layer of polysilicon material 19 approximately 1 micron thick is deposited upon silicon dioxide layer 17. In this regard, it is necessary that layer 17 have a refractive index sufficiently different from layer 19 so as to permit detectable reflection from the interface 21 between these two materials. In the environment described, the refractive index of layer 17 is lower, i.e. silicon dioxide has a refractive index of approximately 1.46 while polysilicon has a refractive index of approximately 4.0. Since polysilicon and single crystalline silicon etch at about the same rate, the etching of polysilicon reference layer 19 in a monitoring mode in the same etching environment as the product material permits a simple correlation to be made whereby the depth of etch, for example, in silicon layer 1 may be determined by measuring the extent of etch in polysilicon layer 19 of the monitor wafer.

Furthermore, since the index of refraction of silicon and polysilicon is nearly four times as great as vacuum or air, the resulting sinusoidal interference record repeats its cycle four times more frequently than the two beam methods of Habegger and Logan et al. This results in a four times improvement in thickness resolution for this preferred embodiment.

Figure 2B:
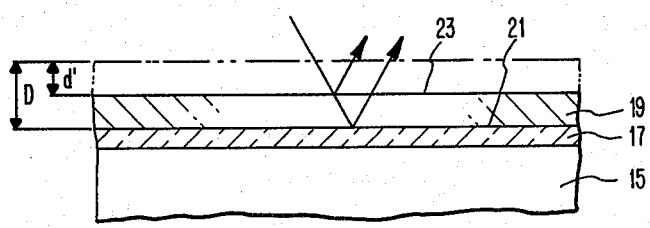
FIG. 2B shows the monitor wafer after having been etched at the same time the product material of FIG. 1 is being etched.

FIG. 2B shows the monitor wafer after having been etched in the same etching environment as the product material. As can be seen, the path length of reflected light from surfaces 21 and 23 has diminished with the etching process with surface 23 being useable to provide a measure of the extent of etching in layer 19. Thus, where D represents the total original thickness of polysilicon layer 19 and d' represents the depth of etch in polysilicon layer 19, d' may be correlated with d in FIG. 1B with d' being determined by the change in path length of the reflected light from surfaces 21 and 23.

Figure 3A:
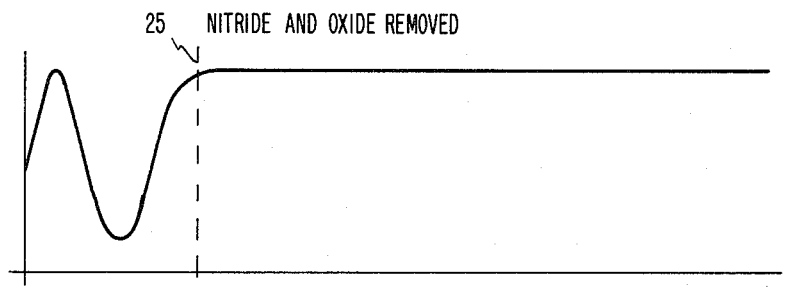
FIG. 3A shows a plot of product test site reflectivity versus time.
Figure 3B:
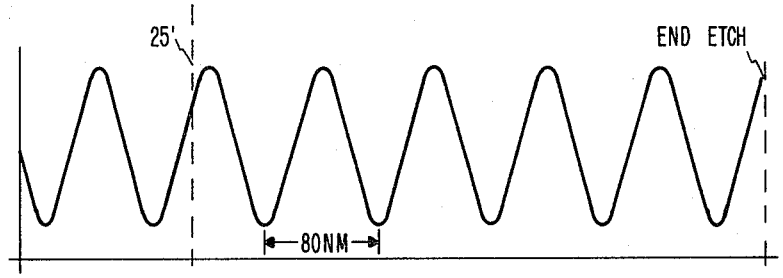
FIG. 3B shows a plot of monitor wafer reflectivity versus time.

FIGS. 3A and 3B show, respectively, the reflectivity signal from the etch site of the product wafer and from the monitor wafer. The purpose in obtaining the interference signal shown in FIG. 3A is to establish a reference point at the time silicon layer 1 in FIG. 1B commences to etch. This point is shown at 25 in FIG. 3A and represents the point in time when nitride layer 5 and oxide layer 3 have been removed from the etch site of the product wafer. Thus, point 25' in FIG. 3B establishes the point on the interference sinusoid signal from the monitor wafer at which depth of etch measurement commences. In this regard, it should be appreciated that in environments where the product material to be etched is not coated but rather commences to etch at the same time as the reference material on the monitor wafer, it is not necessary to use an end point reflectivity signal from the product wafer.

It should also be appreciated that any of a variety of end point detectors using the reflectivity approach may be employed at the etch site of the product wafer and monitor wafer. For example, a conventional laser end point detector may be employed, one at the monitor wafer and, where required, one at the product wafer.

With reference to FIG. 3B, where a HeNe laser at 633 nm is employed in the end point interferometer and silicon is the material being etched (refractive index approximately 4), the peak-to-peak interference sine wave shown therein corresponds to about 80 nm. Thus, where the depth of each d in silicon 1 in FIG. 1B is, for example, 390 nm, the silicon etching should terminate approximately 5 cycles after reference point 25' as shown in FIG. 3B. It is clear, in this regard, that any of a variety of appratus may be employed to detect the point at which etching should terminate. In its simplest form, a strip chart recorder may be employed and the predetermined point on the sinusoid at which etching should terminate may be visually detected. Alternatively, automatic apparatus may be employed to electronically detect the point on the sinusoid whereby automatic shutdown of the etching process is effected.

Figure 4:
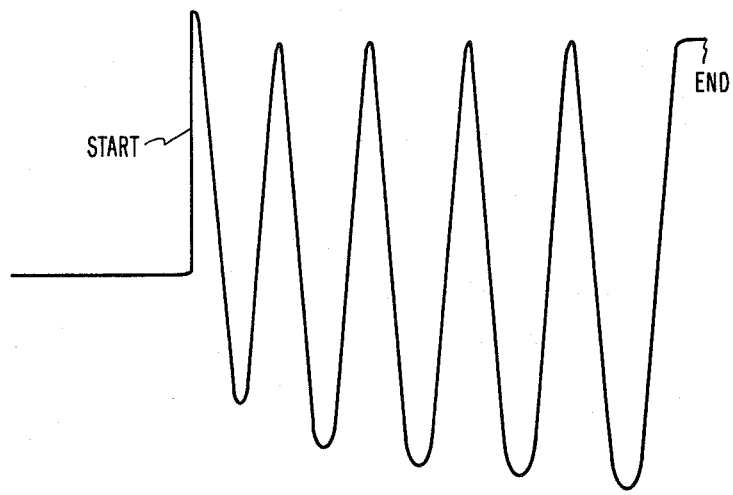
FIG. 4 shows a reproduction of a plot of polysilicon reflectivity versus time in a CF₄ etch plasma.

FIG. 4 shows a reproduction of the recording of the interference sinusoid from the polysilicon material versus time in a $CF_4$ etch plasma environment. The slight increase in amplitude with increasing time is due to the fact that the polysilicon is not purely transparent and, thus, as etching occurs over each cycle the amplitude increases.

Figure 5:
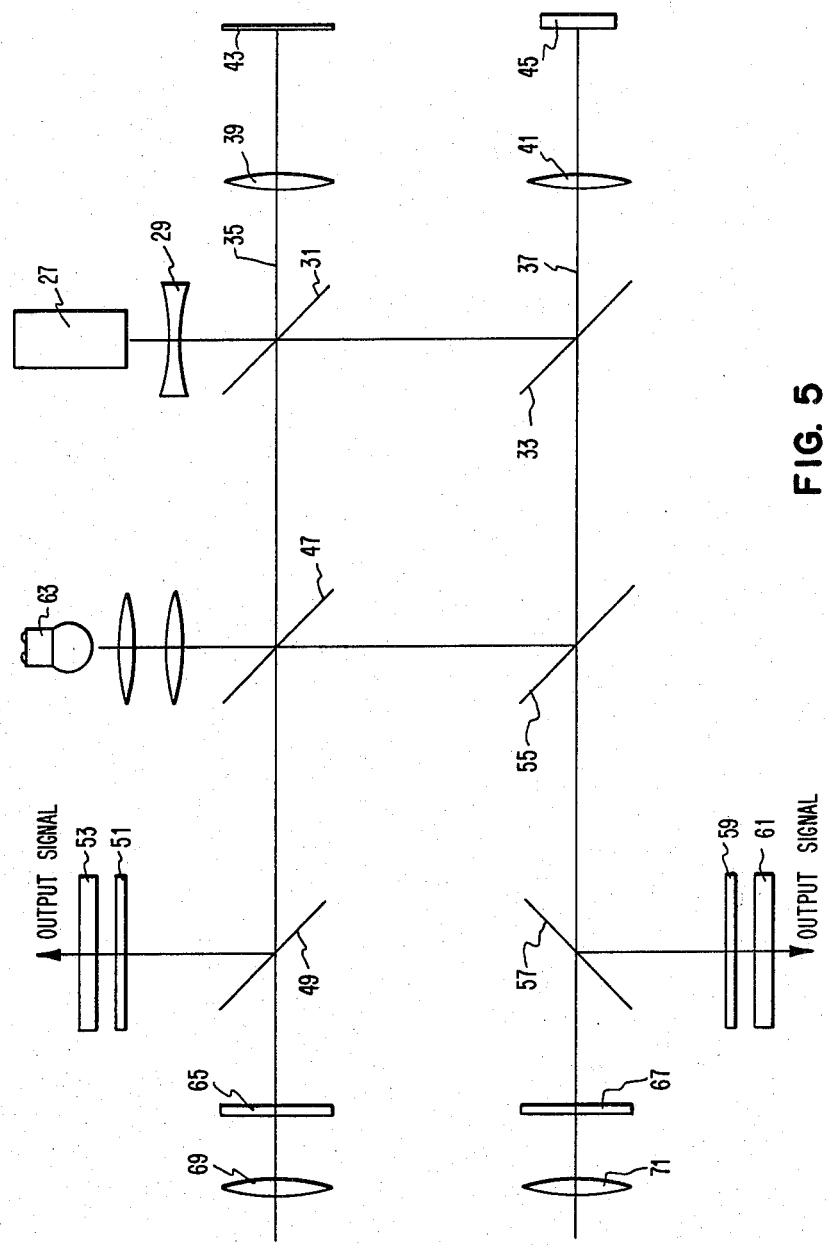
FIG. 5 shows a schematic diagram of one possible optical system that may be employed with the monitoring method and apparatus, in accordance with the present invention.

FIG. 5 shows one possible optical system that may be employed to provide beams of light to the product wafer and monitor wafer, in accordance with the present invention. The system uses a single light source 27 for providing light beams to both the product wafer and monitor wafer. Although light source 27 may be any of a variety of light sources, typically it may be a laser source, such as a HeNe laser source.

Light from laser source 27 is directed through beam expander lens 29 to neutral beam splitter 31 whereby a portion 35 of the light is directed through focusing lens 39 to product wafer 43. The remaining light passes through beam splitter 31 to beam splitter 33 whereby a portion 37 of the remaining light passes through focusing lens 41 to monitor wafer 45.

The reflected light from product wafer 43 is, in turn, passed back through focusing lens 39, beam splitters 31 and 47 to dichroic beam splitter 49 whereby the light is passed through narrow band filter 51 to photodetector 53. In this regard, photodetector 53 provides a product wafer output signal that may be employed, for example, to establish the reference point, as hereinabove described with reference to FIG. 3A.

In similar fashion, the reflected light signal from monitor wafer structure 45 is passed back through focusing lens 41 to neutral beamsplitters 33 and 55 to dichroic beamsplitter 57 when it passes to narrow band filter 59 to photodetector 61 whereby the interference sinusoid from the monitor wafer may be obtained.

Optical alignment of the light beams to the respective wafers may be achieved visually through utilization of background illumination techniques. Thus, light source 63 is employed to provide visible light beams to the product wafer and monitor wafer. This is achieved by employing the netural beamsplitters 47 and 55 (e.g. 80 percent transparent) whereby visible light is passed to the respective wafers 43 and 45 and returned to respective filters 65 and 67 for viewing. Thus, visible light beams may be viewed through focusing lens 69 and 71 from the surface of product wafer 43 and monitor wafer 45 with the visible beams corresponding to the position of the laser beams used for interferometric purposes.

It should be appreciated that any of a variety of arrangements may be employed to obtain the reflective signals from the monitor wafer and, where required, the product wafer. The method and apparatus in accordance with the present invention requires, in its simplest form, a monitor wafer, employed in situ, in the environment where etching or deposition is to be carried out on the product material. The monitor wafer employs a reference material which exhibits a degree of transparency such that interferometric techniques may be employed therewith. In addition, the reference material must exhibit an etching rate which is correlatable to that of the product material to be etched. Finally, the reference material must reside on another material with a sufficiently different refractive index so as to create an optical discontinuity.

It should also be appreciated that correlation between the etch rate of the reference material on the monitor wafer and the material being etched on the product wafer may be implemented in any of a variety of ways. In its simplest form, this correlation may be carried out manually and, through a strip chart recorder, for example, visual techniques employed to terminate etching. Alternatively, data processing equipment may be employed to automatically correlate the etch rates in question whereby the total process may be under control of a computer system or a microprocessor.

While the invention has been particularly shown and described with reference to the preferred embodiment thereof, it will be understood by those skilled in the art that various changes in form and detail may be made therein without departing from the spirit and scope of the invention.

We claim:

1. A process for monitoring changes in thickness of a layer of product material in an environment arranged to produce such changes, comprising the steps of;
   selecting a reference material which exhibits thickness changing characteristics in said environment correlatable to those of the product material in said environment;
   depositing said reference material on a substrate therefor to form a monitor device that exhibits an optical discontinuity between said reference material and substrate;
   positioning said monitor device in the said environment with said product material so that said reference material and product material undergo changes in thickness; and
   directing light to said monitor device so as to obtain reflected light therefrom to monitor the thickness of said reference material, whereby changes in thickness of said reference material may be correlated to changes in thickness of said product material.

2. The process as set forth in claim 1 wherein said environment is an etching environment.

3. The process as set forth in claim 2 wherein said product material is silicon.

4. The process as set forth in claim 3 wherein said reference material is polysilicon.

5. The process as set forth in claim 4 wherein said substrate is $SiO_2$.

6. The process as set forth in claim 5 wherein said etching environment is a reactive ion etching environment.

7. The process as set forth in claim 6 wherein said silicon product material has deposited thereon at least one additional layer of material.

8. The process as set forth in claim 7 wherein light is directed to said product material having at least one additional layer of material thereon so as to obtain reflected light therefrom which may be used to determine the point at which said silicon begins to etch after said additional layer has been etched.

9. The process as set forth in claim 8 wherein a single source of light is used for directing light to both said reference material and said product material.

10. The process as set forth in claim 9 wherein said single source of light is a laser source.

11. The process as set forth in claim 10 wherein said laser source is a He Ne laser source and one cycle of the interference signal derived from the said reflected light from said monitor is indicative of approximately 80 nm of etching of said silicon.

12. A process for monitoring changes in thickness of a layer of product material being etched in an etching chamber comprising;
    selecting a reference material which exhibits etch rate characteristics correlatable to those of said product material;
    depositing said reference material on a substrate so that an optical discontinuity exists between said reference material and substrate;
    positioning said reference material on said substrate in said etching chamber with said product material;
    directing light to said reference material in said etching chamber to obtain reflected light therefrom which may be used to determine the thickness of said reference material; and
    using said reflected light to determine the thickness of said reference material such that changes in thickness of said reference material may be correlated to changes in thickness of said product material.

13. The process as set forth in claim 12 wherein said product material is silicon and said reference material is polysilicon.

14. The process as set forth in claim 13 wherein said substrate is a layer of silicon having a silicon dioxide layer thereon.

15. The process as set forth in claim 14 wherein said etching chamber is a reactive ion etching chamber.

16. The process as set forth in claim 15 wherein light is directed to said product material to obtain reflected light therefrom.

17. The process as set forth in claim 16 wherein said light is obtained from a HeNe laser source.

18. Apparatus for the in situ monitoring of changes in thickness of product material in a chamber arranged to produce changes in thickness of said product material, comprising;
    monitor means positioned within said chamber with said monitor means including a layer of reference material exhibiting thickness changing properties within said chamber correlatable to the thickness changing properties of said product material,
    said monitor means further including substrate means for said reference material arranged so that an optical discontinuity exists between said reference material and substrate means; light source means for directing light to said monitor means so that said monitor means produces reflected light from both said reference material and substrate means; and
    detector means to change said reflected light to a signal having a period indicative of the thickness of said reference material and correlatable to the thickness of said product material.

19. The apparatus as set forth in claim 18 wherein said product material is silicon, said reference material is polysilicon and said substrate means includes $SiO_2$.

20. The apparatus as set forth in claim 19 wherein light is directed to both said product material and monitor means.

21. The apparatus as set forth in claim 20 wherein said light eminates from a HeNe laser light source.

22. The apparatus as set forth in claim 21 wherein said chamber is a reactive ion etching chamber.

* * * * *